W. M. WATSON.
Wheel Plow.
No. 54,453.
Patented May 1, 1866.
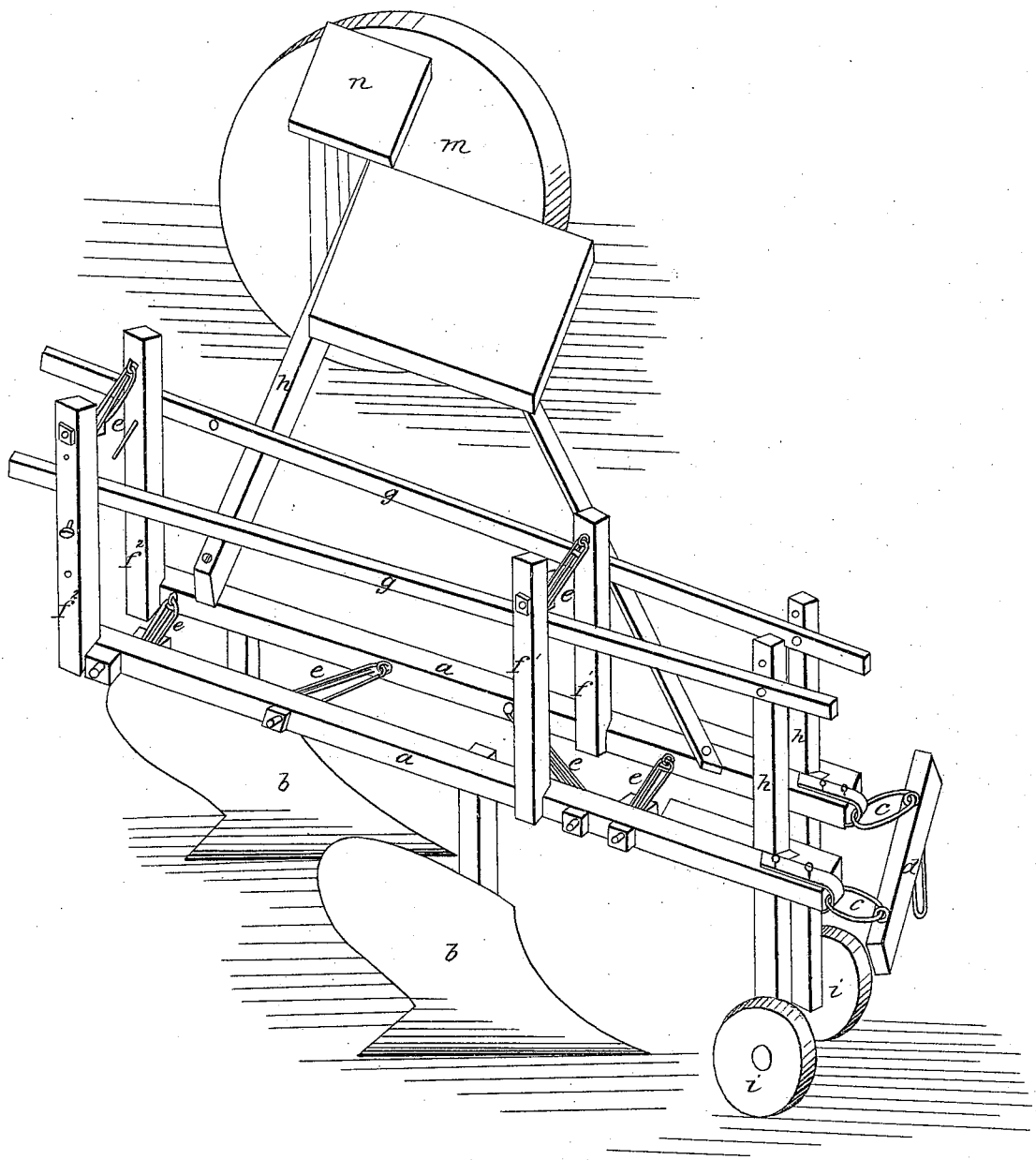
Witnesses:
O. J. Dimmick
R. W. Moore
Inventor:
W. M. Watson

UNITED STATES PATENT OFFICE.

W. M. WATSON, OF TONICA, ILLINOIS.

IMPROVEMENT IN GANG-PLOWS.

Specification forming part of Letters Patent No. 54,453, dated May 1, 1866.

*To all whom it may concern:*

Be it known that I, W. M. WATSON, of Tonica, in the county of La Salle and State of Illinois, have invented a new and useful Improvement in Gang-Plows; and I do hereby declare that the following is a full and exact description thereof, reference being had to the accompanying drawing, and to the letters of reference marked thereon, making a part of this specification.

The object of my invention is to improve the present mode of manufacturing gang-plows in such a manner that the same plow can be adapted to the draft of two, three, four, or more horses, and also so arranged that each plow is independent of the others, and while one plow is set to plow a certain depth the other can be set to plow any other depth, and all will accommodate themselves to the inequality of the ground without interfering with the proper working of the others; also, so arranged that if it is desirable to work one span of horses all the plows except one can be in a few minutes detached, leaving the seat and support attached to the remaining plow, so that a boy or person not able to walk all day can plow as well as a healthy man.

I call a full team four horses, and a gang of two plows turning two furrows of fifteen inches each, making thirty inches turned.

If I wish to use a team of three horses I shorten the braces that hold the plows apart—the work of only a few minutes—and set the plows to turn each eleven and a half inches, thus adapting the labor to the team; and if I wish to use only two horses I detach one plow and use the other.

To enable others skilled in the art to make and use my invention, I will proceed to describe its construction and operation, in which Figure 1 is a perspective view.

$a\ a$ are the plow-beams. $b\ b$ are the mold-boards. $c\ c$ are the clevis and links. $d$ is the evener. They are about the same in all plows, and need no description.

$e\ e\ e\ e\ e\ e$ are braces hinged at each end and attached to an eyebolt at each end, one bolt being longer than the other and double-nutted, the other bolt having a single nut to hold it to its place. The object of the long bolt is to spread the plows farther apart or to draw them closer together at pleasure, one nut being unscrewed and the other screwed up until the proper distance is obtained. The bolts pass through the plow-beams $b\ b$ and the posts $f f$ $f f$, as seen in the drawings.

The posts $f f f f$ are bolted on the sides of the plow-beams for the double purpose of holding the braces in their places and to support and hold the levers $g\ g$ in their places, the object of the hinged braces being to hold the plows in their respective positions, also to allow of the plows being set farther apart or drawn closer together, and to hold the plows stationary in line of draft, and at the same time to allow the plows to move freely up or down to accommodate themselves to rough or uneven ground.

$h\ h$ are slides, on the lower end of which are placed the small wheels $i\ i$, and on the upper end is fixed the levers $g\ g$, the object of which is to raise or lower the plow at pleasure.

The posts $f'\ f'$ are the fulcrums, and $f^2\ f^2$ hold the other end of the lever by means of a pin placed in the post.

$k$ is an axle, on one end of which is hung the wheel $m$, and the driver's seat $n$ is on it, the object of which is to assist in steadying the plow and holding the driver's seat, it being thought desirable to place the seat so that the driver can see the work that his plows are doing all the time without turning his body around, as he would have to do were he placed ahead of the plows.

I do not claim the gang-plow; but

What I do claim is—

The combination, in a gang-plow, of the hinged braces and bolts $e\ e\ e\ e\ e\ e$, or their equivalents, and side seat and support, $n\ m$ $k$, all arranged substantially as and for the purpose set forth.

W. M. WATSON.

Witnesses:
O. J. DIMMICK,
R. W. MOORE.